(No Model.)

J. MERRILL.
GATE.

No. 597,997.  Patented Jan. 25, 1898.

Witnesses
J. Grant Culverwell,
J. F. Riley

Inventor
Jesse Merrill.
By his Attorneys,
C. A. Snow & Co.

UNITED STATES PATENT OFFICE.

JESSE MERRILL, OF KANOPOLIS, KANSAS.

GATE.

SPECIFICATION forming part of Letters Patent No. 597,997, dated January 25, 1898.

Application filed November 18, 1897. Serial No. 658,967. (No model.)

*To all whom it may concern:*

Be it known that I, JESSE MERRILL, a citizen of the United States, residing at Kanopolis, in the county of Ellsworth and State of Kansas, have invented a new and useful Gate, of which the following is a specification.

The invention relates to improvements in gates.

The object of the present invention is to improve the construction of wire gates and to provide a simple, inexpensive, and efficient one, adapted to be readily opened and closed and capable of stretching the wires in closing and of releasing them in opening, whereby the wires will be prevented from kinking and interfering with the opening and closing of the gate.

A further object of the invention is to counterbalance the gate and enable the wires to assist the opening of the same.

The invention consists in the construction and novel combination and arrangement of parts, as hereinafter fully described, illustrated in the accompanying drawings, and pointed out in the claims hereto appended.

Figure 1:
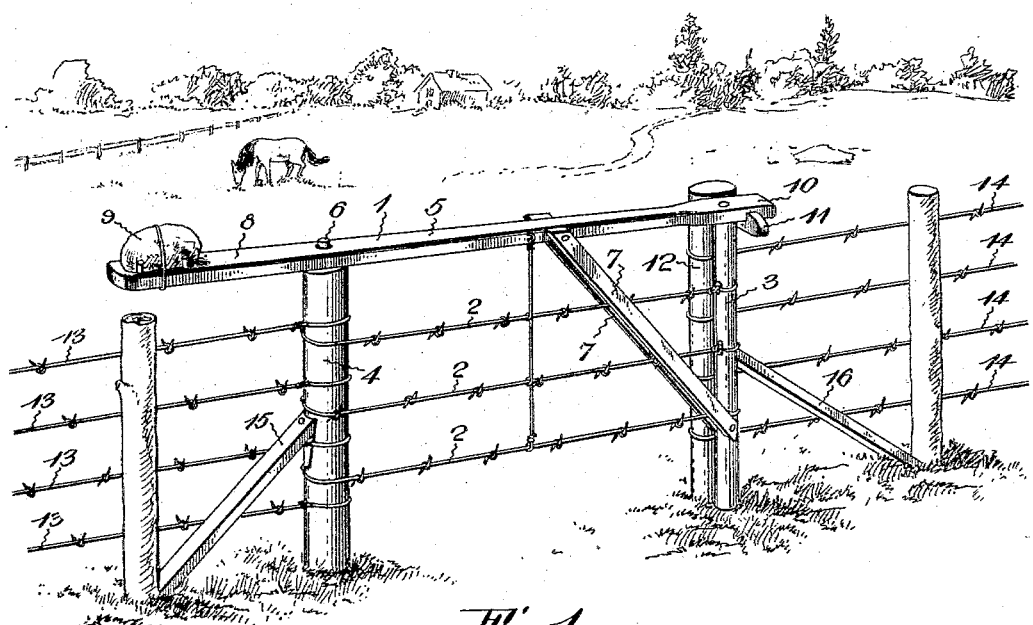
Figure 2:
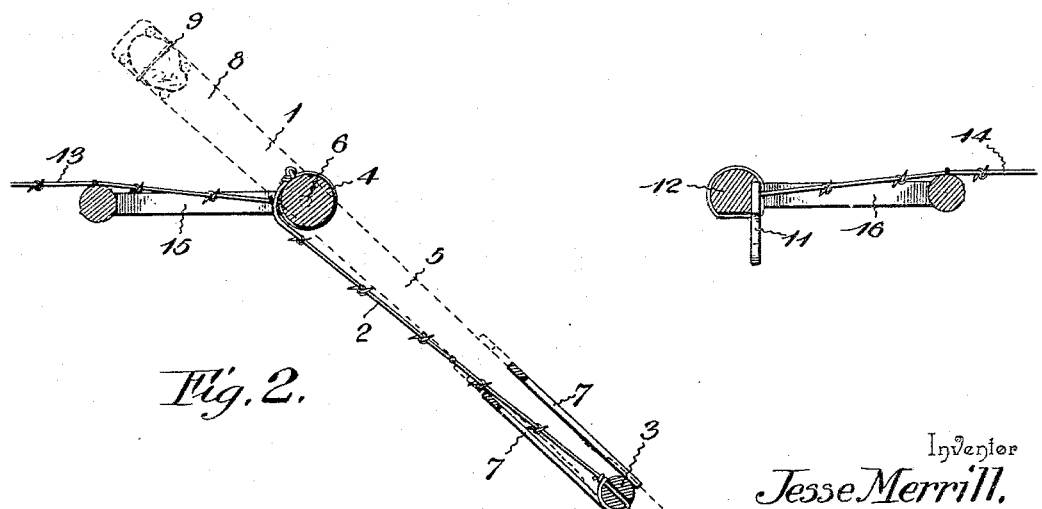

In the drawings, Figure 1 is a perspective view of a wire gate constructed in accordance with this invention and shown closed. Fig. 2 is a horizontal sectional view, the gate being open.

Like numerals of reference designate corresponding parts in both figures of the drawings.

1 designates a wire gate consisting of a substantially L-shaped frame and a series of horizontal wires 2, secured to the vertical end bar 3 of the frame of the gate, at one end of the latter and having their other terminals extending around the back of a hinge-post 4 and fastened to the opposite side thereof, whereby when the gate opens the wires will be slackened and when the gate closes the wires will be stretched. The L-shaped frame of the gate comprises the vertical end bar 3 and a horizontal top bar 5, connected between its ends to the top of the hinge-post 4 by a vertical pivot 6, which is fixed to the post 4 and extends through a perforation of the bar 5. The frame is suitably braced by inclined bars 7, arranged at opposite sides of the gate and secured at their ends to the opposite edges of the bars 3 and 5. The bar 5 extends rearward from the gate, projecting beyond the hinge-post, and in order to counterbalance the gate and prevent the same from sagging the projecting portion or arm 8 carries a weight 9, which may be of any suitable form.

The hinge-post 4 is preferably round, as illustrated in the accompanying drawings, and the horizontal wires, which are preferably barbed, are fastened to the post on the side opposite the direction in which the gate swings in opening, and the stretching action exerted on the horizontal wires by the closing of the gate operates in a measure to assist the opening of the same and prevents any liability of the wires kinking and interfering with the closing of the gate.

The front end 10 of the horizontal top bar of the gate projects beyond the front end bar and is arranged to engage a keeper 11, which extends horizontally from a latch-post 12. The latch-post 12 and the hinge-post have the adjacent ends of the fence-wires 13 and 14 attached to them, and they are supported by inclined braces 15 and 16, extending upward from the fence-posts and abutting against shoulders of the latch and hinge posts. This construction prevents the gate from being affected by the stretching of the fence-wires.

The invention has the following advantages: The wire gate is simple and comparatively inexpensive in construction. It is counterbalanced and prevented from sagging, and the horizontal wires are stretched by the closing of the gate and released when the same is opened, whereby the wires are prevented from kinking and interfering with the operation of the gate. The wires by being stretched by the closing of the gate operate to assist the opening of the same.

Changes in the form, proportion, and minor details of construction may be resorted to without departing from the spirit or sacrificing any of the advantages of this invention.

What I claim is—

1. In a gate of the class described, the combination of a hinge-post, a swinging frame mounted thereon, and wires secured at one end to the frame and connected at the other end to the hinge-post and arranged to be wrapped around the same when the gate closes and unwrapped when the gate opens, whereby the wires are stretched by the closing of the gate, substantially as and for the purpose described.

2. In a gate of the class described, the combination of a hinge-post, a swinging frame mounted thereon, and horizontal wires secured at one end to the frame and having their other ends extending around the back of the hinge-post and secured to the same on the side opposite the direction in which the gate swings in opening, whereby the wires will be stretched by the closing of the gate, substantially as described.

3. In a gate of the class described, the combination of a hinge-post provided at its top with a pivot, a substantially L-shaped frame composed of a vertical end bar and a horizontal top bar mounted on the said pivot and extending in rear of the hinge-post, the rear end of the horizontal bar being weighted and the front end being extended beyond the front end bar, wires connected with the hinge-post and the front end bar, and a latch-post provided at its top with a keeper arranged to be engaged by the front end of the horizontal bar, substantially as described.

In testimony that I claim the foregoing as my own I have hereto affixed my signature in the presence of two witnesses.

JESSE MERRILL.

Witnesses:
F. C. GRIFFITH,
FRANK LIVINGSTON.